United States Patent Office 3,457,154
Patented July 22, 1969

3,457,154
DEHYDROGENATION OF PARAFFINIC HYDROCARBONS
George R. Lester, Park Ridge, Ill., assignor to Universal Oil Products Company, Des Plaines, Ill., a corporation of Delaware
No Drawing. Filed Nov. 19, 1965, Ser. No. 508,856
Int. Cl. C07c *3/24;* B01j *1/10*
U.S. Cl. 204—162                              10 Claims

ABSTRACT OF THE DISCLOSURE

Paraffinic compounds, particularly branched chain paraffinic compounds such as for example 2,3-dimethylbutane can be dehydrogenated by exposure to light having a wavelength less than about 4400 A. in the presence of a hydrogen abstraction agent. 2,3-dimethylbutane can be converted by exposure to light from a mercury arc in the presence of benzophenone to 2,3-dimethyl-2-butene.

---

This invention relates to a process for the dehydrogenation of paraffinic compounds. More particularly, the invention is concerned with a process whereby paraffinic hydrocarbons are subjected to dehydrogenation via a photosensitizing reaction.

Olefinic hydrocarbons of various configurations, straight chain, branched chain or cyclic in nature will find a wide variety of uses in the chemical field. For example, olefins are useful as intermediates in the preparation of polyhydric alcohols such as glycols or polyhalides, these compounds being used in the preparation of many other industrial compounds. In addition, some olefinic hydrocarbons which posses branched chain configuration may also be utilized as components in the preparation of plastics and resins, the particular configuration of the olefin adding certain desirable characteristics to the finished polymeric product. Still another use for these compounds include their utilization as intermediates in the preparation of pharmaceuticals, insecticides, etc.

It is therefore an object of this invention to provide a novel process for the preparation of olefinic compounds.

Another object of this invention is to provide a process for the photosensitized dehydrogenation of paraffinic compounds to provide olefinic compounds of particular configuration.

In one aspect, an embodiment of this invention resides in a process for the photosensitized dehydrogenation of a paraffinic compound which comprises exposing said paraffinic compound to the emission from a light source having a wavelength less than and about 4400 A. in the presence of a hydrogenation abstraction agent at dehydrogenation conditions and recovering the resultant olefinic compound.

A specific embodiment of this invention is found in a process for the photosensitized dehydrogenation of 2,3-dimethylbutane which comprises exposing said butane to the emission from a light source having a wavelength less than about 4000 A. in the presence of benzophenone at a temperature in the range of from about 0° to about 150° C. and at a pressure in the range of from about atmospheric to about 50 atmospheres, and recovering the resultant 2,3-dimethyl-2-butene.

Other objects and embodiments will be found in the following further detailed description of this invention.

As hereinbefore set forth, the process of the present invention is concerned with the photosensitized dehydrogenation of paraffinic hydrocarbons which preferably contain a branched chain configuration. The dehydrogenation is effected by exposing the branched chain paraffinic hydrocarbon to the emission from a light source having a wavelength of less than about 4400 A. and preferably less than 4000 A., said dehydrogenation being effected in the presence of a hydrogen abstraction agent. The resultant reaction product will produce an olefin of the same carbon number along with relatively small quantities of branched dimer and dehydrogenated branched dimer. This process is particularly effective when the desired product comprises an olefin in which the double bond is adjacent to the tertiary carbon atoms which are present. This is due to the fact that there is a greater ease of hydrogen abstraction from a tertiary carbon atom relative to a secondary carbon atom and to a greater ease of hydrogen abstraction from a secondary carbon atom relative to a primary carbon atom. In addition, the production of an olefin is highly favored as compared to a dimer production if the branched chain paraffinic hydrocarbon contains two adjacent tertiary carbon atoms.

Examples of paraffinic hydrocarbons which may undergo a photosensitized dehydrogenation according to the process of the present invention include 2,3-dimethylbutane, 2,3 - dimethylpentane, 2,3 - dimethylhexane, 2,3-dimethylheptane, 2,3 - dimethyloctane, 3,4 - dimethylhexane, 3,4 - dimethylheptane, 3,4 - dimethyloctane, 1,2-dimethylhexane, 1,2 - dimethylcycloheptane, 1,2 - dimethylcyclooctane, 4,5 - dimethyloctane. It is also contemplated within the scope of this invention that branched chain paraffinic hydrocarbons such as 2 - methylbutane, 2 - methylpentane, 2 - methylhexane, 2 - methylheptane, 2 - methyloctane, 3 - methylpentane, 3 - methylhexane, 3 - methylheptane, 3 - methyloctane, etc., may also undergo photosensitized dehydrogenation according to the process of this invention, although not necessarily with equivalent results.

As hereinbefore set forth, the dehydrogenation process is effected in the presence of a hydrogen abstraction agent which may also be characterized as a "sensitizer." The preferred hydrogen abstraction agents which may be used comprise organic compounds containing oxy substitutents such as ketones which include acetone, methyl ethyl ketone, diethyl ketone, ethyl propyl ketone, dipropyl ketone, propyl butyl ketone, dibutyl ketone, acetophenone, ethyl benzyl ketone, propyl phenyl ketone, benzophenone (diphenyl ketone), etc.

The photosensitized dehydrogenation of the branched chain paraffic hydrocarbons is effected by irradiating the paraffin with a light source capable of existing the sensitizer or hydrogen abstraction agent. The light source which is used is that which possesses a wave length less than about 4400 A. and preferably less than 4000 A. One particular light source which may be utilized in the present invention comprises a medium pressure mercury arc lamp. These lamps usually containing a specific amount of mercury vapor and a large amount of a rare gas, the total pressure being above atmospheric. These mercury arc lamps possess strong emission lines at 2537 A., 2900 A. and 3660 A. among others. It is also contemplated within the scope of this invention that a low pressure mercury arc lamp in which the mercury vapor and rare gas having a total pressure less than atmospheric may also be used. Another light source which may be utilized to effect the photosensitized dehydrogenation of the present process comprises a specifically prepared fluorescent light which will also emit energy at the desired wave length, that is, a large portion at wave lengths not higher than about 3700 A.

The photosensitized dehydrogenation reaction of the present process proceeds via a hydrogen atom extraction from the most substituted carbon atom by the light-excited sensitizer. The radical so produced may dimerize or, if a second hydrogen atom is extracted from the same molecule, will then form an olefin at the most substituted carbon atom. Therefore, by utilizing a branched chain paraffin which contains alkyl substitutents on adjacent carbon atoms, the product which is formed in the greatest amount will be an olefin in which the tertiary carbon atoms adjacent to each other possess a double bond. It is contemplated within the scope of this invention that the hydrogen abstraction agent in a reduced state may be regenerated by passing air through the sensitiser after the olefin product has been recovered. The photosensitized dehydrogenation reaction will be effected at temperatures ranging from about 0° to about 150° C. and at pressures ranging from about atmospheric to about 50 atmospheres, the amount of pressure utilized being that which is necessary to maintain a major portion of the reactants in the liquid phase.

The process of this invention may be effected in any suitable manner and may comprise either a batch or continuous type operation. When utilizing a batch type operation, a quantity of the branched chain paraffinic hydrocarbon and the hydrogen abstraction agent are placed in an appropriate apparatus. This apparatus may comprise a quartz reactor or a glass reactor depending upon the wave length of the radiation emission source. In addition, it is also contemplated within the scope of this invention that a reactor made of a synthetic material known in the trade as Vycor may also be utilized. The resulting solution is then irradiated for a predetermined residence time at dehydrogenation conditions, utilizing the aforementioned emission from a light source at a wave length below about 4000 A. The residence time during which this dehydrogenation reaction is effected will usually range from about 0.5 to about 16 hours or more. Upon completion of the aforementioned residence time, the reaction product is recovered and the desired olefin is separated from any unreacted starting materials and dimer by fractional distillation or any other conventional means of separation.

As hereinbefore set forth, it is also contemplated that a continuous manner of operation is used. When such a manner of operation is utilized, the compounds comprising the branched chain paraffinic hydrocarbon and the hydrogen abstraction agent are continuously charged to a reaction zone comprising a quartz, glass or Vycor reactor. This reactor is maintained at the suitable operating conditions of temperature and pressure. The solution is then subjected to irradiation from a light source of the type hereinbefore set forth in greater detail which possesses a wave length less than about 4000 A. Upon completion of the desired residence time, the reactor effluent is continuously withdrawn and separated from any unreacted starting materials and/or side products, the desired branched chain olefinic hydrocarbon being passed to storage. The unreacted starting material is separated from the hydrogen abstraction agent and recycled to form a portion of the feed stock while the aforementioned hydrogen abstraction agent is regenerated by passage of air or oxygen therthrough, following which said sensitiser is also recycled to the reactor.

Examples of branched chain olefinic hydrocarbons which may be prepared according to the process of this invention include 2,3-dimethyl-2-butene, 2,3-dimethyl-2-pentene, 2,3-dimethyl-2-hexene, 2,3-dimethyl-2-heptene, 2,3-dimethyl-2-ocetene, 3,4-dimethyl - 3-hexene, 3,4-dimethyl-3-heptene, 3,4-dimethyl-3-octene, 1,2-dimethyl-1-cyclohexene, 1,2-dimethyl-1-cycloheptene, 1,2-dimethyl-1-cyclooctene, 4,5-dimethyl-4-octene, 2-methyl-2-butene, 2-methyl-2-pentene, etc.

The following examples are given to illustrate the process of the present invention which, however, are not intended to limit the generally broad scope of the present invention in strict accordance therewith.

EXAMPLE I

In this example, 86 g. (1.0 mole) of 2,3-dimethylbutane and 364 g. (2.0 mole) of benzophenone are placed in a quartz reactor. The reactor is sealed and exposed to the resonance emission from a mercury resonance lamp which has a wave length of 2537 A. for a period of about 4 hours. At the end of this time, the irradiation is discontinued and the reactor opened. The reaction product is recovered and subjected to fractional distillation, the desired 2,3-dimethyl-2-butene being recovered.

EXAMPLE II

In this example, 55 g. (0.5 mole) of 1,2-dimethylcyclohexane and 182 g. (1.0 mole) of benzophenone are placed in a quartz reactor. The reactor and contents thereof is exposed to the resonance emission at a wave length of 2537 A., said emission coming from a mercury resonance arc lamp. Upon completion of the irradiation which is carried on for a period of about 4 hours, the irradiation is discontinued and the reactor opened. The reaction product is recovered and subjected to fractional distillation, the desired 1,2-dimethyl-1-cyclohexene being recovered therefrom.

EXAMPLE III

A glass reactor is charged with 86 g. (1.0 mole) of 2-methylpentane and 240 g. (2.0 mole) of acetophenone. The reactor is sealed, after which said reactor and contents thereof are then exposed to irradiation at a wave length of 2537 A. from a mercury resonance lamp. After irradiation for a period of about 4 hours, the mercury resonance lamp is turned off and the reactor opened. The reaction product is then subjected to fractional distillation to recover the desired 2-methyl-2-pentene.

EXAMPLE IV

A mixture of 114 g. (1.0 mole) of 2,4-dimethylhexane and 240 g. (2.0 mole) of acetophenone are placed in a quartz reactor. The reactor is sealed and subjected to a resonance emission from a mercury arc resonance lamp, said emission being at a wave length of 2537 A. At the end of the desired residence time, which comprises a period of about 4 hours, the irradiation is discontinued and the reactor opened. The reaction product is treated in a manner similar to that hereinbefore set forth and the desired product comprising 2,4-dimethyl-2,4-hexadiene is recovered.

EXAMPLE V

In this example, a mixture of 142 g. (1.0 mole) of 2,3-dimethyloctane and 364 g. 2.0 mole) of benzophenone is placed in a quartz reactor which is thereafter sealed. The reactor and contents thereof are then exposed to the resonance emission at a wave length of 2537 A. from a mercury resonance lamp. Upon completion of the desired residence time, the irradiation is discontinued and the reactor is opened and the reaction product subjected to fractional distillation. The desired product comprising 2,3-dimethyl-2-octene being separated and recovered.

I claim as my invention:

1. A process for the photosensitized dehydrogenation of a branched chain paraffinic hydrocarbon which comprises exposing said paraffinic hydrocarbon to the emission from a light source having a wave length less than about 4400 A. in the presence of a hydrogen abstraction agent at dehydrogenation conditions and recovering the resultant olefinic hydrocarbon having the same number of carbon atoms as the paraffinic hydrocarbon.

2. The process as set forth in claim 1, further characterized in that said dehydrogenation conditions include a temperature in the range of from about 0° to about 150° C. and a pressure in the range of from about atmospheric to about 50 atmospheres.

3. The process as set forth in claim 1, further characterized in that said hydrogen abstraction agent comprises benzophenone.

4. The process as set forth in claim 1, further characterized in that said hydrogen abstraction agent is acetophenone.

5. The process as set forth in claim 1, further characterized in that said wave length is less than about 4000 A.

6. The process as set forth in claim 1, further characterized in that said paraffinic hydrocarbon comprises 2,3-dimethylbutane and said olefinic hydrocarbon comprises 2,3-dimethyl-2-butene.

7. The process as set forth in claim 1, further characterized in that said paraffinic hydrocarbon comprises 1,2-dimethylcyclohexane and said olefinic hydrocarbon comprises 1,2-dimethyl-1-cyclohexene.

8. The process as set forth in claim 1, further characterized in that said paraffinic hydrocarbon comprises 2-methyl-pentane and said olefinic hydrocarbon comprises 2-methyl-2-pentene.

9. The process as set forth in claim 1, further characterized in that said paraffinic hydrocarbon comprises 2,4-dimethylhexane and said olefinic hydrocarbon comprises 2,4-dimethyl-2,4-hexadiene.

10. The process as set forth in claim 1, further characterized in that said paraffinic hydrocarbon comprises 2,3-dimethyloctane and said olefinic hydrocarbon comprises 2,3-dimethyl-2-octene.

References Cited

UNITED STATES PATENTS 2,655,474   10/1953   Schutze et al. _____ 204—162

FOREIGN PATENTS 801,563   9/1958   Great Britain.

OTHER REFERENCES

Elad et al.: J. Organic Chemistry, vol. 29 (July 1964), pages 1855 and 1856.

HOWARD S. WILLIAMS, Primary Examiner